United States Patent
Arunagiri et al.

(10) Patent No.: US 10,073,938 B2
(45) Date of Patent: Sep. 11, 2018

(54) INTEGRATED CIRCUIT DESIGN VERIFICATION

(71) Applicant: International Business Machines Corporation, Armonk, NY (US)

(72) Inventors: Anand B. Arunagiri, Bangalore (IN); Raj K. Gajavelly, Warangal (IN); Sujeet Kumar, Bangalore (IN); Pradeep K. Nalla, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 59 days.

(21) Appl. No.: 15/196,050

(22) Filed: Jun. 29, 2016

(65) Prior Publication Data
US 2018/0004879 A1    Jan. 4, 2018

(51) Int. Cl.
G06F 17/50    (2006.01)

(52) U.S. Cl.
CPC ........ G06F 17/5045 (2013.01); G06F 17/504 (2013.01); *G06F 17/505* (2013.01); *G06F 17/5022* (2013.01); *G06F 17/5031* (2013.01); *G06F 2217/84* (2013.01)

(58) Field of Classification Search
CPC ............... G06F 17/504; G06F 17/5045; G06F 17/5022; G06F 17/5031; G06F 17/505; G06F 2217/84
See application file for complete search history.

(56) References Cited

U.S. PATENT DOCUMENTS

| | | | | |
|---|---|---|---|---|
| 5,095,454 A | * | 3/1992 | Huang | G06F 17/5031 703/19 |
| 6,188,262 B1 | * | 2/2001 | Sutherland | G06F 1/06 327/291 |
| 6,487,705 B1 | * | 11/2002 | Roethig | G06F 17/5045 716/104 |
| 6,968,514 B2 | * | 11/2005 | Cooke | G06F 17/5045 716/102 |
| 7,120,883 B1 | * | 10/2006 | van Antwerpen | G06F 17/5045 716/102 |
| 7,299,439 B1 | * | 11/2007 | Slonim | G06F 17/505 716/116 |
| 7,370,296 B2 | * | 5/2008 | Koyfman | G06F 11/2257 714/E11.157 |
| 7,409,377 B2 | * | 8/2008 | Emek | G06N 99/005 700/246 |
| 7,421,669 B2 | | 9/2008 | Baumgartner et al. | |

(Continued)

OTHER PUBLICATIONS

Yuan, J., et al., "Constraint-Based Verification", Chapter: Constraint Diagnosis, Sub-Paragraph: Reachability Analysis, p. 185, 2006.
(Continued)

*Primary Examiner* — Helen Rossoshek
(74) *Attorney, Agent, or Firm* — Anthony R. Curro

(57) ABSTRACT

Disclosed aspects relate to verifying an integrated circuit design. A set of design constraints may be received with respect to a verification process for the integrated circuit design. Based on the set of design constraints, a constraint model may be constructed. A new global constraint may be determined using the constraint model. The new global constraint may be used to process the verification process for the integrated circuit design.

19 Claims, 5 Drawing Sheets

(56) References Cited

U.S. PATENT DOCUMENTS

| | | | |
|---|---|---|---|
| 7,480,884 B1* | 1/2009 | Slonim | G06F 17/5045 |
| | | | 716/119 |
| 7,660,732 B2* | 2/2010 | Malitski | G06Q 10/047 |
| | | | 705/338 |
| 7,779,378 B2* | 8/2010 | Baumgartner | G06F 17/504 |
| | | | 716/106 |
| 7,870,523 B1* | 1/2011 | Uziel | G06F 11/263 |
| | | | 703/2 |
| 7,958,470 B1 | 6/2011 | Siarkowski | |
| 8,103,490 B2* | 1/2012 | Voirin | G06F 17/50 |
| | | | 703/2 |
| 8,156,462 B2* | 4/2012 | Moon | G06F 17/504 |
| | | | 716/101 |
| 8,201,118 B2* | 6/2012 | Baumgartner | G06F 17/504 |
| | | | 716/107 |
| 8,316,332 B1 | 11/2012 | Goyal et al. | |
| 8,327,302 B2* | 12/2012 | Baumgartner | G06F 17/504 |
| | | | 716/101 |
| 8,418,119 B2* | 4/2013 | Case | G06F 17/505 |
| | | | 716/104 |
| 8,423,939 B1* | 4/2013 | Hurst | G06F 17/505 |
| | | | 703/19 |
| 8,671,395 B1 | 3/2014 | Yuan et al. | |
| 8,910,099 B1 | 12/2014 | Goyal et al. | |
| 8,990,746 B1 | 3/2015 | Goyal et al. | |
| 2003/0229871 A1* | 12/2003 | Nakae | G06F 17/5031 |
| | | | 716/108 |
| 2006/0242525 A1* | 10/2006 | Hollander | G01R 31/31704 |
| | | | 714/742 |
| 2007/0233765 A1* | 10/2007 | Gupta | G06F 11/263 |
| | | | 708/446 |
| 2009/0319252 A1 | 12/2009 | De et al. | |
| 2010/0042658 A1* | 2/2010 | Kamiyama | G06F 17/50 |
| | | | 345/420 |
| 2012/0136635 A1* | 5/2012 | Hung | G06F 17/11 |
| | | | 703/2 |
| 2012/0253754 A1 | 10/2012 | Goswami et al. | |
| 2012/0290282 A1* | 11/2012 | Case | G06F 17/5022 |
| | | | 703/15 |
| 2014/0165022 A1* | 6/2014 | Stevens | G06F 17/5031 |
| | | | 716/134 |
| 2017/0124240 A1* | 5/2017 | Baumgartner | G06F 17/5045 |

OTHER PUBLICATIONS

Mony, H., et al., "Exploiting Constraints in Transformation-Based Verification", vol. 3725 of Lecture Notes in Computer Science, pp. 269-284, 2005.

Jaeger, T., et al., "Resolving Constraint Conflicts", Proceedings of the 9th ACM Symposium on Access Control Models and Technologies, pp. 105-114, 2004.

* cited by examiner

INTEGRATED CIRCUIT DESIGN VERIFICATION

BACKGROUND

This disclosure relates generally to computer systems and, more particularly, relates to verifying an integrated circuit design. Integrated circuit design verification may be desired to be performed as efficiently as possible. The amount of integrated circuit designs that need to be managed by enterprises is increasing. As integrated circuit design complexity increases, the number of potential integrated circuit design errors may also increase. Accordingly, reliable hardware and software systems for performing verification of integrated circuit designs may grow in importance.

SUMMARY

Aspects of the disclosure relate to verifying an integrated circuit design. Compatible and incompatible design constraints may be extracted and identified from an integrated circuit design specification. A formal model may be constructed based on the design constraints using chicken switches. The formal model of the design constraints may be combined into the verification flow for the integrated circuit design. Verification of the integrated circuit design may be performed using the formal model of compatible and incompatible design constraints. Leveraging the formal constraint model may facilitate efficient verification of integrated circuit designs.

Disclosed aspects relate to verifying an integrated circuit design. A set of design constraints may be received with respect to a verification process for the integrated circuit design. Based on the set of design constraints, a constraint model may be constructed. A new global constraint may be determined using the constraint model. The new global constraint may be used to process the verification process for the integrated circuit design.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
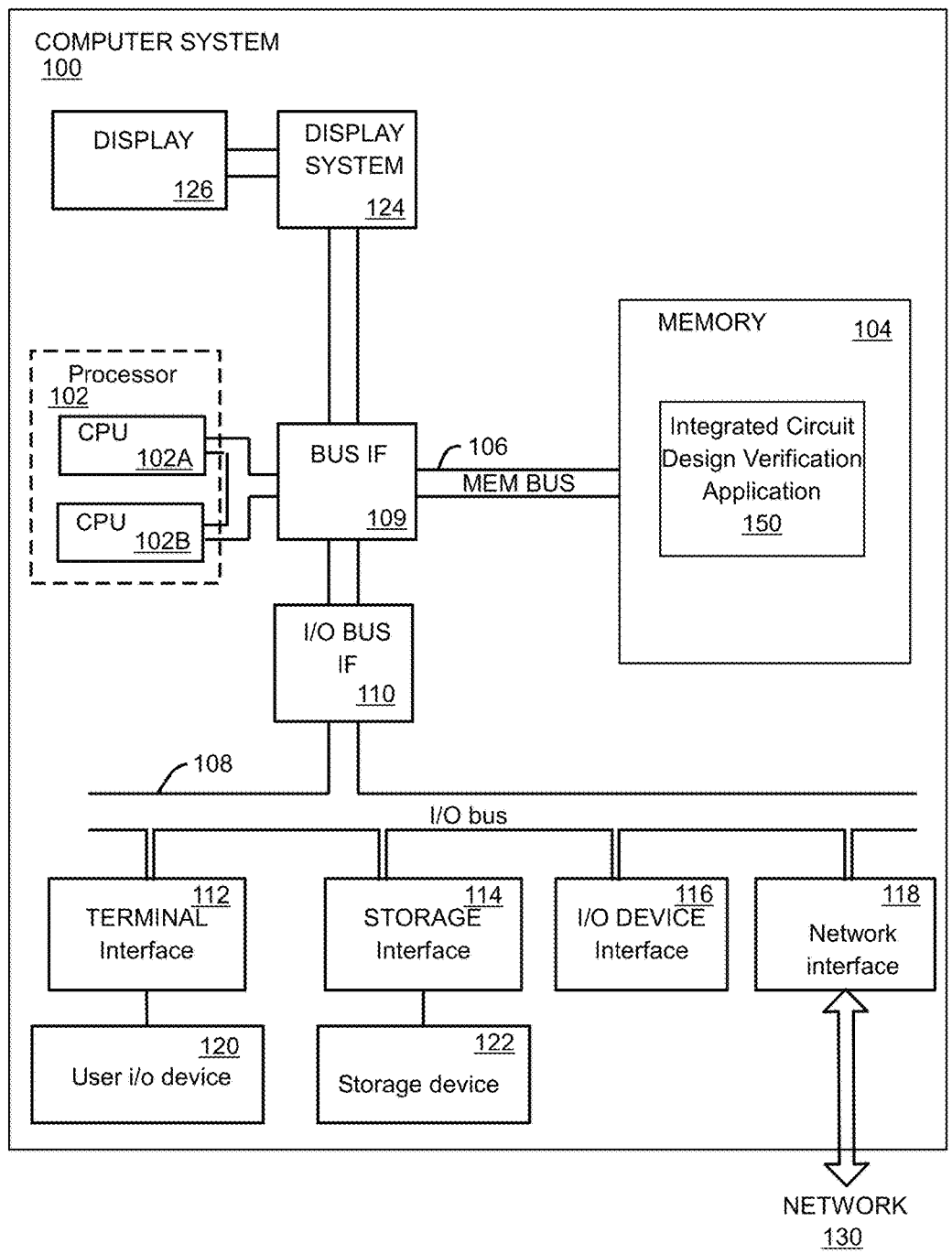
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to verifying an integrated circuit design. Compatible and incompatible design constraints may be extracted and identified from an integrated circuit design specification (e.g., primary inputs, sequential latches). A formal model may be constructed based on the design constraints using chicken switches. The formal model of the design constraints may be combined (e.g., embedded) into the verification flow for the integrated circuit design. Verification of the integrated circuit design may be performed using the formal model of compatible and incompatible design constraints. Leveraging the formal constraint model may facilitate efficient verification of integrated circuit designs.

As the usage of integrated circuits in devices such as computers, automobiles, and mobiles devices continues to increase, designers make use of a variety of techniques to identify errors and analyze design constraints prior to integrated circuit production. A small change during the design phase of an integrated circuit can have cascading effects for other areas of the integrated circuit. If these changes are identified and made while the semiconductor is in the design phase, software design tools can modify the architecture appropriately with little ramifications. If, however, a design error is found after production has transitioned to tooling and fabrication, a design change could necessitate the retooling of the entire production line (e.g., requiring considerable resources). As such, ensuring proper integrated circuit design is an important part of the integrated circuit production process. In some situations, the design constraints (e.g., requirements or parameters such as desired system specifications, budget, requirements, mode settings) of an integrated circuit design must be verified individually to determine their affect on the integrated circuit, necessitating significant resources and testing iterations. Accordingly, aspects of the disclosure relate to a constructing a constraint model for evaluating the design constraints, and consolidating compatible design constraints into a lesser number of design constraints (e.g., new global constraint) in order to reduce the time and resources needed for design constraint analysis, and facilitate integrated circuit design verification.

Aspects of the disclosure include a method, system, and computer program product for verifying an integrated circuit design. Aspects of the disclosure relate to receiving a set of design constraints with respect to a verification process for the integrated circuit design. The set of design constraints may be analyzed to detect a compatibility characteristic. Based on and in response to analyzing the set of design constraints to detect the compatibility characteristic, a compatible subset of the set of design constraints may be identified. In embodiments, the set of design constraints may be filtered to extract a compatible subset. In embodiments, a new modeled design constraint may be generated for each individual design constraint of the compatible subset. Based on generating the new modeled design constraint for each individual design constraint of the compatible subset, a set of modeled compatible design constraints may be built. In embodiments, in response to building the set of modeled compatible design constraints, the set of design constraints may be removed. In embodiments, each individual design constraint of the compatible subset may be evaluated to a Boolean true value. In embodiments, based on and in response to analyzing the set of design constraints to detect the compatibility characteristic, an incompatible subset of the set of design constraints may be identified. The set of design constraints (e.g., the combination of design constraints) may be filtered to extract an incompatible subset. In embodiments, at least one design constraint of the incompatible subset may be evaluated to a Boolean false value.

Aspects of the disclosure relate to constructing a constraint model based on the set of design constraints. The constraint model may use a set of chicken switches. In embodiments, based on and in response to identifying the compatible subset of the set of design constraints, the compatible subset may be combined in the constraint model. In embodiments, based on and in response to identifying the incompatible subset of the set of design constraints, the incompatible subset may be masked in the constraint model. In embodiments, masking the incompatible subset in the constraint model may occur in a dynamic fashion.

Aspects of the disclosure relate to determining a new global constraint using the constraint model. In embodiments, the new global constraint may be resolved based on the compatible subset. In embodiments, the constraint model may be embedded with the verification process for the integrated circuit design. Using the new global constraint, the verification process for the integrated circuit design may be processed. In embodiments, the receiving, the constructing, the determining, and the processing described herein may each occur in an automated fashion without user intervention. Aspects of the disclosure may provide performance or efficiency benefits when verifying a design of an integrated circuit (e.g., speed, performance, flexibility, resource usage).

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store an integrated circuit design verification application 150. In embodiments, the integrated circuit design verification application 150 may include instructions or statements that execute on the processor 102 or instructions or statements that are interpreted by instructions or statements that execute on the processor 102 to carry out the functions as further described below. In certain embodiments, the integrated circuit design verification application 150 is implemented in hardware via semiconductor devices, chips, logical gates, circuits, circuit cards, and/or other physical hardware devices in lieu of, or in addition to, a processor-based system. In embodiments, the integrated circuit design verification application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the 1/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
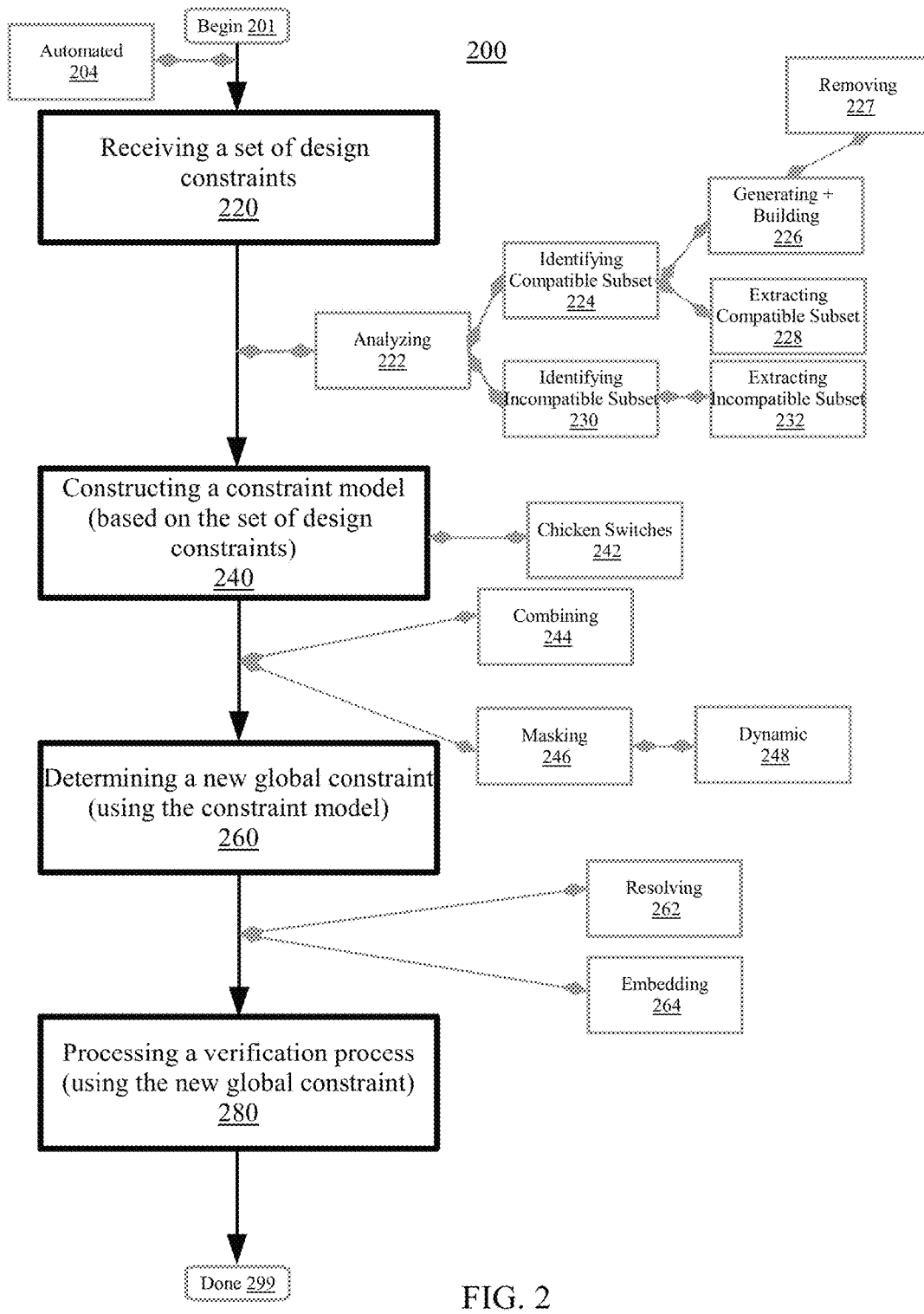
FIG. 2 is a flowchart illustrating a method for verifying an integrated circuit design, according to embodiments.

FIG. 2 is a flowchart illustrating a method 200 for verifying an integrated circuit design. Generally, the integrated circuit design can include a layout or arrangement of the logical elements (e.g., logic gates, Boolean functions) and circuit components (e.g., transistors, capacitors, resistors) included in the architecture of an integrated circuit. The integrated circuit design may include a model of a piece of hardware described in a hardware description language. In embodiments, the integrated circuit design may include a collection of inputs, outputs, state elements, and combinational functions configured to compute subsequent states and logic outputs from currents states and outputs. Aspects of method 200 relate to constructing a constraint model of received design constraints for an integrated circuit, and using the constraint model to determine a new global constraint for processing a verification process of the integrated circuit design. The constructed constraint model may facilitate efficient verification of an integrated circuit design. The method 200 may begin at block 201.

In certain embodiments, the receiving, the constructing, the determining, the processing, and other steps described herein may each occur in an automated fashion without user intervention at block 204. In embodiments, the receiving, the constructing, the determining, the processing, and other steps described herein may be carried out by an internal integrated circuit design verification management module maintained in a persistent storage device of a computing node that also includes the integrated circuit design. In certain embodiments, the steps described herein may be carried out by an external integrated circuit design verification management module hosted by a remote computing device or server (e.g., accessible via a subscription, usage-based, or other service model).

At block 220, a set of design constraints may be received with respect to a verification process for the integrated design circuit. Generally, receiving can include collecting, gathering, obtaining, identifying, determining, or accepting delivery of the set of design constraints. In embodiments, receiving the set of design constraints can include identifying the set of design constraints based on blueprints or other design materials for the integrated circuit. For example, receiving the set of design constraints may include examining design blueprints for an integrated circuit and ascertaining elements of the circuit design that may lead to reduced performance or restricted functionality. The set of design constraints can include requirements, specifications, demands, or parameters that influence (e.g., limit) the behavior of one or more functions of an integrated circuit. The set of design constraints may include real requirements (e.g., clocking requirements, budget requirements) related to the development of the integrated circuit, or artificial limitations (e.g., mode settings) that arise based on the verification process. In embodiments, receiving the set of design constraints may include inspecting the integrated circuit design based on a set of design criteria, and designating aspects of the integrated circuit design that may have negative impacts (e.g., performance, efficiency) with respect to the set of design criteria. In certain embodiments, the set of design constraints may be received directly from a user (e.g., designer of the integrated circuit.) Other methods of receiving the set of design constraints for the integrated circuit design are also possible.

In embodiments, the set of design constraints may be analyzed to detect a compatibility characteristic at block 222. Generally, analyzing can include examining (e.g., performing an inspection of the set of design constraints), evaluating (e.g., generating an appraisal of the set of design constraints), resolving (e.g., ascertaining an observation/conclusion/answer with respect to the set of design constraints), parsing (e.g., deciphering structured and unstructured data constructs of the set of design constraints), querying (e.g., asking a question regarding the set of design constraints), or categorizing (e.g., organizing by a feature or type of the set of design constraints). Data analysis may include a process of inspecting, cleaning, transforming, or modeling data to discover useful information, suggest conclusions, or support decisions. Data analysis can extract information/patterns from a data set and transform/translate it into an understandable structure for further use. In embodiments, analyzing the set of design constraints may include inspecting the set of design constraints to determine those design constraints that have a compatibility characteristic (e.g., indication of correct operation, software/hardware support, positive performance result) with respect to the integrated circuit. As an example, analyzing the set of design constraints can include generating a simulation of the integrated circuit illustrated in the integrated circuit design, and testing the set of design constraints to ascertain information regarding the performance characteristics of the set of design constraints with respect to the integrated circuit. Other methods of analyzing the set of design constraints are also possible.

In embodiments, a compatible subset of the set of design constraints may be identified at block 224. The compatible subset of the set of design constraints may be identified based on and in response to analyzing the set of design constraints to detect the compatibility characteristic. Generally, identifying can include discovering, ascertaining, recognizing, grouping, designating, or otherwise determining the compatible subset of the set of design constraints. In embodiments, identifying the compatible subset of the set of design constraints can include ascertaining a subset of the set of design constraints that are suitable or consistent with the integrated circuit design. The compatible subset of the set of design constraints may include those design constraints that are supported (e.g., hardware requirements are achieved) by the integrated circuit, operate correctly (e.g., as intended by design specifications), or have positive performance impacts with respect to the integrated circuit. In embodiments, identifying the compatible subset of the set of design constraints may include determining those design constraints (e.g., logic inputs) that are associated with positive logic outputs with respect to the integrated circuit (e.g., using a logic testing technique). For instance, each individual design constraint of the compatible subset may be evaluated to a Boolean true value (e.g., 1). Other methods of identifying the compatible subset are also possible.

In embodiments, a new modeled design constraint may be generated for each individual design constraint of the compatible subset at block 226. Generally, generating can include creating, modifying, altering, producing, formulating, computing, or otherwise establishing the new modeled design constraint. In embodiments, generating the new modeled design constraint can include running each individual design constraint of the compatible subset through a latch circuit (e.g., chicken switch) to facilitate combination with one or more other compatible design constraints. In embodiments, the new modeled design constraints can include intermediary design constraints that are verified to be suitable (e.g., compatible) with respect to the integrated circuit design. The new modeled design constraints may be normalized, formatted, or aligned with one or more performance criteria of the integrated circuit to expedite combination with one or more other compatible design constraints. Other methods of generating the new modeled design constraints are also possible.

In embodiments, a set of modeled compatible design constraints may be built at block 226. The set of modeled compatible design constraints may be built based on generating the new modeled design constraints for each individual design constraint of the compatible subset. Generally, building can include constructing, assembling, sorting, organizing, or otherwise establishing the set of modeled compatible design constraints. In embodiments, building the set of modeled compatible design constraints can include aggregating (e.g., collecting, gathering) the new modeled design constraints, and grouping them based on type, performance properties, function, behavior, or other characteristic to indicate readiness for combination with one or more other compatible design constraints. For instance, building the set of modeled compatible design constraints may include arranging new modeled design constraints that have similar performance characteristics as part of the same group (e.g., compatible design constraints that have similar performance characteristics may be candidates for combination). Other methods of building the set of modeled compatible design constraints are also possible.

In embodiments, the set of design constraints may be removed at block 227. The set of design constraints may be removed in response to building the set of modeled compatible design constraints. Generally, removing can include deleting, discarding, taking out, replacing, excluding, or otherwise disregarding the set of design constraints. In embodiments, removing the set of design constraints can include eliminating the set of design constraints from the set of modeled compatible design constraints. Aspects of the disclosure, in embodiments, relate to combining one or more modeled compatible design constraints (e.g., to determine a new global constraint). As such, in embodiments, it may be desirable to remove the set of design constraints (e.g., original design constraints for which compatibility has not been assessed) to facilitate management and combination of the set of modeled compatible design constraints. As an example, removing the set of design constraints may include marking each design constraint with a tag to indicate distinction (e.g., for exclusion) from the set of modeled compatible design constraints. As another example, removing the set of design constraints may include replacing the set of design constraints with the new modeled design constraints. Other methods of removing the set of design constraints are also possible.

In embodiments, a compatible subset may be extracted at block 228. The compatible subset may be extracted by filtering the set of design constraints. Generally, extracting can include selecting, extricating, drawing-out, ascertaining, withdrawing, or otherwise determining the compatible subset. In embodiments, as described herein, extracting may include filtering the set of design constraints to identify the compatible subset of the set of design constraints. For instance, a set of integrated circuit compatibility criteria (e.g., specifications for hardware/software supportability, operation requirements, performance standards) may be applied to the set of design constraints to filter out those design constraints that are compatible with the integrated circuit design. As another example, the set of design constraints may be tested using an algorithm or latch circuit to evaluate compatibility between the set of design constraints and the integrated circuit design. Those design constraints that are determined to be compatible with the integrated circuit design may be extracted as the compatible subset. Other methods of filtering the set of design constraints to extract the compatible subset are also possible.

In embodiments, an incompatible subset of the set of design constraints may be identified at block 230. The incompatible subset of the set of design constraints may be identified based on and in response to analyzing the set of design constraints to detect the compatibility characteristic. Generally, identifying can include discovering, ascertaining, recognizing, grouping, designating, or otherwise determining the incompatible subset of the set of design constraints. In embodiments, identifying the incompatible subset of the set of design constraints can include ascertaining a subset of the set of design constraints that are not suitable or appropriate respect to the integrated circuit design. The incompatible subset of the set of design constraints may include those design constraints that are not supported (e.g., by hardware of software features) by the integrated circuit, do not operate correctly (e.g., exhibit irregular behavior or functionality), or have negative performance impacts (e.g., cause errors, require excessive system resources) with respect to the integrated circuit. In embodiments, identifying the incompatible subset of the set of design constraints may include determining those design constraints (e.g., logic inputs) that are associated with negative logic outputs with respect to the integrated circuit (e.g., using a logic testing technique). For instance, at least one design constraint of the incompatible subset may be evaluated to a Boolean false value (e.g., 0). Other methods of identifying the incompatible subset are also possible.

In embodiments, an incompatible subset may be extracted at block 232. The incompatible subset may be extracted by filtering the set of design constraints. Generally, extracting can include selecting, collecting, sorting, ascertaining, or otherwise determining the incompatible subset. In embodiments, as described herein, extracting may include filtering the set of design constraints to identify the incompatible subset of the set of design constraints. For instance, a set of integrated circuit compatibility criteria (e.g., specifications for hardware/software supportability, operation requirements, performance standards) may be applied to the set of design constraints to filter out those design constraints that are incompatible with the integrated circuit design. As another example, the set of design constraints may be tested using an algorithm or latch circuit to evaluate compatibility between the set of design constraints and the integrated circuit design. Those design constraints that are determined to be incompatible with the integrated circuit design may be extracted as the compatible subset. Other methods of filtering the set of design constraints to extract the compatible subset are also possible.

At block 240, a constraint model may be constructed based on the set of design constraints. Generally, constructing can include assembling, building, arranging, formulating, creating, or otherwise establishing the constraint model. In embodiments, constructing the constraint model can include creating a physical or virtual representation of one or more aspects of the integrated circuit design in order to evaluate one or more attributes, properties, or characteristics (e.g., performance, resource requirements, functionality) of the set of design constraints. For instance, constructing the constraint model may include assembling a physical circuit (e.g., dedicated test circuit, portion of the integrated circuit design) in order to assess the compatibility of the set of design constraints with respect to the integrated circuit design. The set of design constraints may be applied as input parameters for one or more logic functions of the constraint model. In certain embodiments, each design constraint of the set of design constraints may be paired with a primary input test parameter and fed as inputs to a logic gate of the constraint model (e.g., to assess compatibility). The constraint model may then be run to collect data about the running performance of the set of design constraints within the constraint model. In certain embodiments, constructing the constraint model may include building a virtual simulation environment configured to evaluate the set of design constraints. Other methods of constructing the set of design constraints are also possible.

In embodiments, aspects of the disclosure relate to constructing a constraint model that uses a set of chicken switches at block 242. Generally, the set of chicken switches can include a latch having a special configuration bit that is provided to the logic network at power on (e.g., of the circuit). The values of the configuration bits are captured as the initial states of dedicated registers that hold the values of the configuration bits permanently while power is applied to the logic. For example, the set of chicken switches can include a circuit mechanism having a latch with its output connected to one of its inputs, and the other input initialized with a randomized primary input value. As such, the primary randomized primary input value may be static, and maintained as the same value throughout the design constraint verification process. In embodiments, aspects of the disclosure relate to constructing a constraint model using a set of chicken switches such that the output of the chicken switch makes up one input of a subsequent logic gate (e.g., OR gate), and the other input of the logic gate is a design constraint of the set of design constraints. Other methods of using chicken switches and constructing the constraint model are also possible.

In embodiments, the compatible subset may be combined at block 244. The compatible subset may be combined based on and in response to identifying the compatible subset of the set of design constraints. Generally, combining can include grouping, fusing, coupling, connecting, integrating, or otherwise merging the compatible subset. Aspects of the disclosure, as described herein, relate to identifying a subset of the set of design constraints that are compatible (e.g., positive performance impacts, stable operation, positive logic outputs) with respect to the integrated circuit, and consolidating them into a fewer number of design constraints. Accordingly, in embodiments, the compatible subset may be combined in the constraint model. In embodiments, combining the compatible subset may include merging the compatible subset of the set of design constraints into a single new design constraint. The single new design constraint may have a single input and a single output established (e.g., with respect to a logic testing technique). As an example, the set of design constraints may be evaluated by the constraint model (e.g., run through the simulation to determine compatibility), and the design constraints that are identified as part of the compatible subset may be fused together into a single design constraint. In embodiments, combining the compatible subset may have positive impacts with respect to integrated circuit design verification efficiency (e.g., combining compatible design constraints may reduce the number of times the verification process must be performed). Other methods of combining the compatible subset are also possible.

In embodiments, the incompatible subset may be masked at block 246. The incompatible subset may be masked based on and in response to identifying the incompatible subset of the set of design constraints. Generally, masking can include hiding, disregarding, skipping, suppressing, concealing, or otherwise excluding the incompatible subset. Aspects of the disclosure, as described herein, relate to identifying a subset of the set of design constraints that are incompatible (e.g., negative performance impacts, unstable operation, negative logic outputs) with respect to the integrated circuit, and removing them from the integrated circuit verification process. Accordingly, in embodiments, the incompatible subset may be masked in the constraint model. In embodiments, masking may include filtering the incompatible subset from the set of design constraints. Consider the following example. As described herein, the set of design constrains may be applied as inputs to logic functions of the constraint model. The constrain model may parse the set of design constraints to evaluate the compatibility of each design constraint. In response to identifying the incompatible subset, the incompatible subset may be filtered out from the set of design constraints and removed from the constraint model. In embodiments, the masked design constraints may be added to a list for later managing or processing. Other methods of masking the incompatible subset are also possible.

In embodiments, masking the incompatible subset in the constraint model may occur in a dynamic fashion at block 248. Generally, masking the incompatible subset in a dynamic fashion may include hiding or suppressing the incompatible subset on-the-fly in real-time as part of the design constraint evaluation process. In embodiments, masking the incompatible subset in a dynamic fashion can include masking incompatible design constraints as they are identified without pausing operation of the constraint model. Consider the following example. The set of design constraints may include a set of sequentially ordered constraints A through Z. The set of design constraints may be applied to the constraint model, and the constraint model may begin evaluating the compatibility of each design constraint. The constraint model may determine that design constraints A through J are compatible. In response to determining that design constraint K is incompatible, the constraint model may mask design constraint K and continue evaluating the remaining design constraints. Other methods of masking the incompatible subset in a dynamic fashion are also possible.

At block 260, a new global constraint may be determined using the constraint model. Generally, determining can include identifying, designating, formulating, resolving, electing, deriving, generating, or ascertaining the new global constraint. The new global constraint may include an aggregate parameter that represents one or more attributes of a plurality of design constraints of the set of design constraints. In embodiments, determining can include generating the new global constraint based on characteristics, properties, or attributes of other design constraints in the constraint model. For example, the set of design constraints may be analyzed to ascertain the performance characteristics, logical functionality, resource requirements, and other data for each design constraint of the set of design constraints (e.g., using the constraint model), and this information may be used to create a new global constraint that incorporates the attributes of each individual design constraint into a single comprehensive design parameter. In embodiments, the new global constraint may be determined based on the compatible subset of the set of design parameters (e.g., the incompatible subset may be excluded). In certain embodiments, the new global constraint may be determined using shared attributes (e.g., characteristics in common between a subset of the set of design constraints) of the set of design parameters, while non-shared attributes may be isolated for separate verification. Other methods of determining the new global constraint based on the constraint model are also possible.

In embodiments, the new global constraint may be resolved based on the compatible subset at block 262. Generally, resolving can include designating, identifying, ascertaining, aggregating, combining, or otherwise determining the new global constraint. In embodiments, resolving may include forming the new global constraint by combining the design constraints of the compatible subset into a single aggregate new global constraint. For example, as described herein, the constraint model may be used to determine the compatibility of each design constraint of the set of design constraints (e.g., with respect to the integrated circuit design). In response to determining that a particular design constraint is compatible, it may be marked to indicate readiness for combination with other compatible design constraints. Accordingly, once one or more of the design constraints of the set of design constraints have been evaluated, those design constraints determined to be compatible (e.g., the compatible subset) may be marked as ready for combination, and fused into the new global constraint. As described herein, in certain embodiments, the new global design constraint may be generated so as to represent one or more properties or attributes of the compatible subset of the set of design constraints. The new global design constraint may be used to facilitate verification of the integrated circuit design. Other methods of resolving the new global constraint are also possible.

In embodiments, the constraint model may be embedded with the verification process for the integrated circuit design at block 264. Generally, embedding can include linking, coupling, joining, bundling, inserting, associating, or otherwise including the constraint model with the verification process. In embodiments, embedding can include tagging one or more locations of the constraint model with call-out tags to illustrate aspects relevant to the integrated design circuit verification process (e.g., why a particular design constraint was determined to be compatible/incompatible). Embedding the constraint model with the verification process may include saving or maintaining the constraint model in association with the verification process such that mutual data access, retrieval, modification, and other verification process tasks may be smoothly performed. For instance, the constraint model may be bundled together in a single digital package (e.g., file container) with executable files configured to perform the verification process. In certain embodiments, embedding can include configuring the integrated circuit design to operate in association with the constraint model to perform verification tasks. In embodiments, the constraint model may be configured to automatically initiate one or more operations in response to execution of a particular verification process task. Other methods of embedding the constraint model with the verification process for the integrated circuit design are also possible.

At block 280, the verification process for the integrated circuit design may be processed using the new global constraint. Generally, processing can include performing, initiating, running, executing, or otherwise carrying-out the verification process for the integrated circuit design. In embodiments, processing the verification process can include evaluating the integrated circuit design to determine the expected performance, functionality, cost, logical accuracy, and other characteristics of the integrated circuit (e.g., prior to design finalization and manufacturing). Aspects of the disclosure relate to using the new global constraint to facilitate verification of the integrated circuit design. For instance, using the new global constraint may reduce the number of trials or iterations needed to verify the set of design constraints (e.g., rather than testing each design constraint individually, the new global constraint may be used to verify the compatible subset of design constraints in a single trial/iteration). As an example, during verification of the set of design constraints, the compatible subset may be replaced with the new global constraint in order to reduce the number of verification trials. Other methods of using the new global constraint for processing the verification process of the integrated circuit design are also possible.

Consider the following example. A set of 26 design constraints labeled A through Z may be received. The set of design constraints may be analyzed, and a compatible subset and an incompatible subset may be identified. A constraint model may be constructed using the set of design constraints and a set of chicken switches. The constraint model may be used to evaluate the characteristics (e.g., compatibility) of the set of design constraints. The constraint model can use the set of chicken switches to selectively sort the set of design constraints into a plurality of subsets of the set of design constraints. In embodiments, design constraints I, K, Q, T, and Y may be determined as incompatible design constraints, and the rest of the design constraints may be determined to be compatible (e.g., sorting in a selective fashion based on compatibility/incompatibility). Accordingly, as described herein, design constraints I, K, Q, T, and Y may be masked (e.g., suppressed) from the constraint model, and the remaining compatible design constraints may be combined into a new global constraint. The constraint model may be embedded along with the verification process for the integrated circuit design. In embodiments, verification of the integrated circuit design may be performed by using the new global constraint to reduce the number of iterations necessary to evaluate the set of design constraints. Other methods of using the new global constraint to facilitate verification of an integrated circuit design are also possible.

Method 200 concludes at block 299. Aspects of method 200 may provide performance or efficiency benefits for verifying an integrated circuit design. For example, aspects of method 200 may have positive impacts with respect to constructing a constraint model having a new global constraint for processing a verification process with respect to an integrated circuit design. As described herein, the receiving, constructing, determining, and processing described herein may each occur in an automated fashion without user intervention. Altogether, leveraging the constraint model may facilitate efficient integrated circuit design verification (e.g., reduced number of verification trials).

Figure 3:
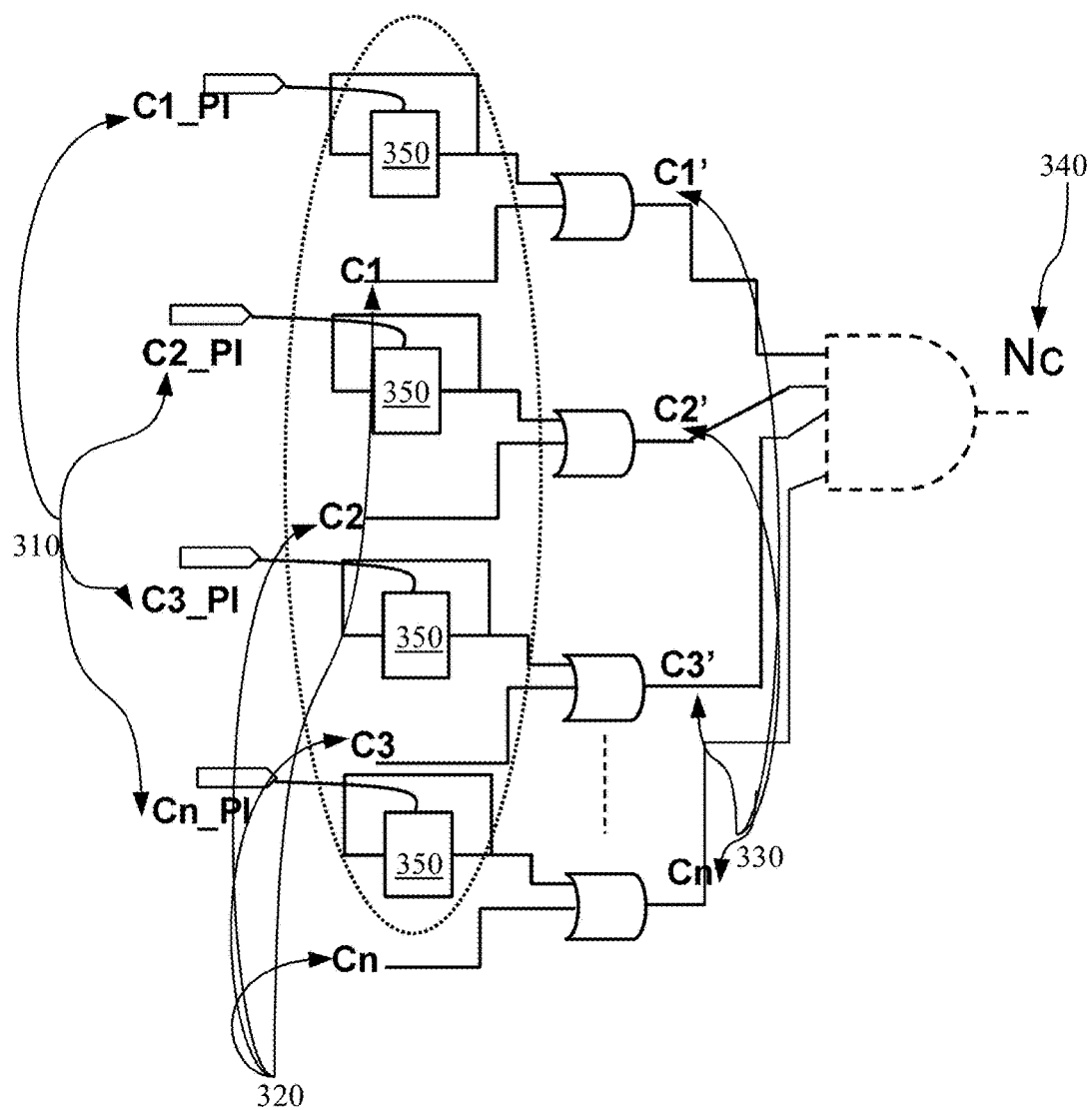
FIG. 3 is an example constraint model for verifying an integrated circuit design, according to embodiments.

FIG. 3 is an example constraint model 300 for verifying an integrated circuit design, according to embodiments. The constraint model 300 can include a physical (e.g., test circuit) or virtual (e.g., software simulation) representation of one or more aspects of the integrated circuit design in order to evaluate one or more attributes, properties, or characteristics (e.g., performance, resource requirements, functionality) of the set of design constraints. In embodiments, the set of design constraints 320 (e.g., C1, C2, C3, Cn) may be applied as inputs to logic gates (e.g., OR gates), with the other input of the logic gate occupied by the output of a chicken switch 350. As described herein, the chicken switches can include latches having a special configuration bit that is held permanently at a randomized value. For instance, as shown in FIG. 3, the set of chicken switches 350 may be initialized by a set of primary inputs 310 (e.g., C1_PI, C2_PI, C3_PI, Cn_PI). In embodiments, as described herein, the constraint model 300 may be configured to assess each design constraint of the set of design constraints 320 to determine compatibility with the integrated circuit design. Each design constraint may be tested, and a set of new modeled design constraints 330 may be generated as the outcome of the logic gates. The set of new modeled design constraints 330 may include intermediary design constraints that are verified to be compatible with respect to the integrated circuit design. In embodiments, as described herein, the set of new modeled design constraints 330 may be combined and resolved into a new global constraint 340. Accordingly, the new global constraint 340 may facilitate efficient verification of the integrated circuit design. Other types of constraint models are also possible. Constraint models having greater or fewer design constraints, chicken switches, logic gates, or other configurations are also possible.

Figure 4:
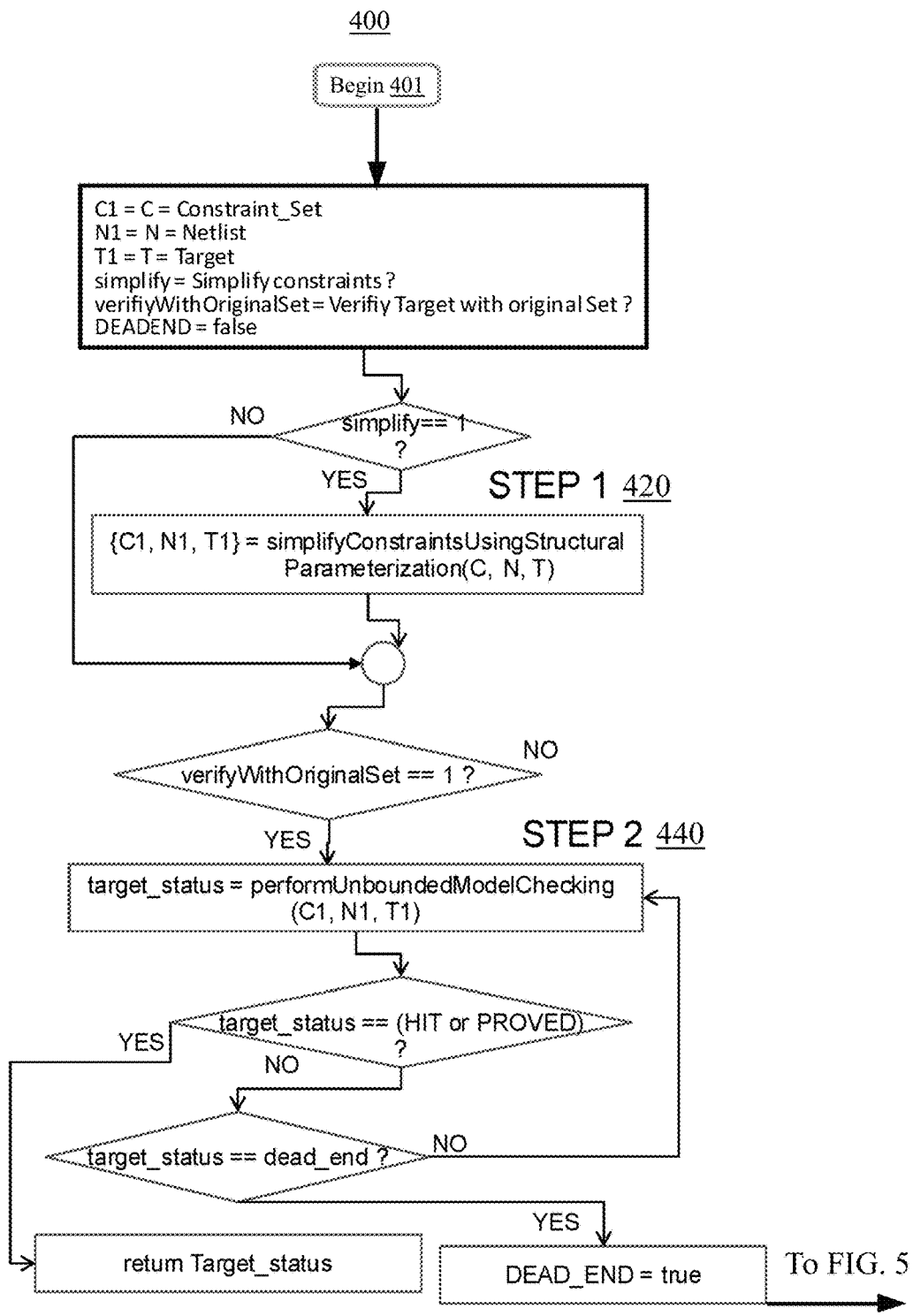
FIG. 4 is a flowchart illustrating aspects of a method for managing a set of design constraints of an integrated circuit design, according to embodiments.

FIG. 4 is a flowchart illustrating aspects of a method 400 for managing a set of design constraints of an integrated circuit design. The method 400 may being at block 401. As described herein, aspects of the disclosure relate to receiving a set of design constraints. In embodiments, a plurality of design constraints of the set of design constraints may have common properties, characteristics, or other attributes. Accordingly, aspects of the disclosure relate to using structural parameterization techniques to simplify the constraints at block 420 (Step 1). Simplifying can include combining, filtering, removing, adjusting, or otherwise modifying the set of design constraints to configure them for evaluation or combination. In certain embodiments, the method 400 may proceed to block 440 (Step 2) to perform unbounded model checking (e.g., additional processing of the set of design constraints). In embodiments, the method 400 may proceed to evaluating the set of design constraints (e.g., as shown in FIG. 5.)

Figure 5:
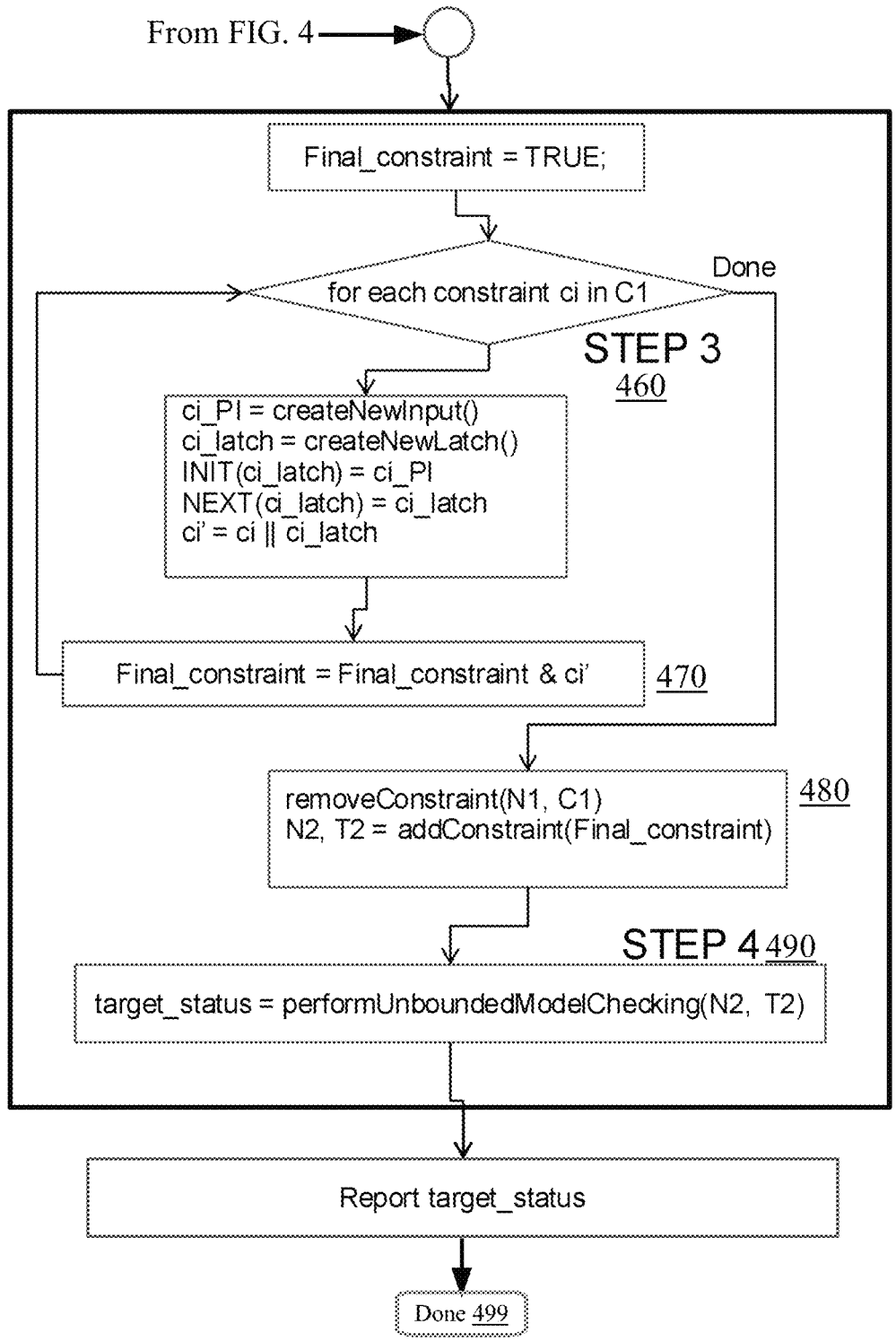
FIG. 5 is a flowchart illustrating aspects of a method for managing a set of design constraints of an integrated circuit design, according to embodiments.

FIG. 5 is a flowchart illustrating aspects of a method 450 for managing a set of design constraints of an integrated circuit design. The method 450 may be continued from FIG. 4. As described herein, aspects of the disclosure relate to constructing a constraint model to evaluate the compatibility of the set of design constraints and determining a new global constraint to facilitate verification of the integrated circuit design. Accordingly, the set of design constraints may be processed for inclusion in the constraint model at block 460 (Step 3). As described herein, a design constraint of the set of design constraints may be applied as an input to a logic gate together with the output of a latch (e.g., chicken switch) configured to maintain a static value based on a primary input. This process may be repeated for each design constraint of the set of design constraints so as to construct a constraint model having a plurality of component circuits each containing a design constraint, a primary input, a chicken switch, and a logic gate. In embodiments, a new modeled constraint (e.g., final constraint) that is verified to be compatible with respect to the integrated circuit design may be output from each component circuit at block 470. As described herein, the set of design constraints (e.g., original design constraints fed into the constraint model) may be removed from the constraint model at block 480. In embodiments, unbounded model checking may be performed for the constraint model at block 490. As described herein, the set of new modeled constraints may be resolved to generate a new global constraint for use verifying the integrated circuit design. The method 400 may end at block 499.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for verifying an integrated circuit design, the method comprising:
   receiving by a computer system, with respect to a verification process for the integrated circuit design, a set of design constraints;
   constructing, based on the set of design constraints, a constraint model by assembling a physical circuit, the constraint model representing one or more aspects of the integrated circuit design in the physical circuit, the set of design constraints applied as inputs to logic gates in the physical circuit;
   determining by the computer system, using the constraint model, a new global constraint; and
   processing by the computer system, using the new global constraint, the verification process for the integrated circuit design, wherein the constraint model uses a set of chicken switches to sort, in a selective fashion, the set of design constraints into a plurality of subsets of the set of design constraints, the chicken switches including a latch having a special configuration bit held permanently to a randomized value.

2. The method of claim 1, further comprising:
   analyzing the set of design constraints to detect a compatibility characteristic.

3. The method of claim 2, further comprising:
   identifying, based on and in response to analyzing the set of design constraints to detect the compatibility characteristic, a compatible subset of the set of design constraints.

4. The method of claim 2, further comprising:
   identifying, based on and in response to analyzing the set of design constraints to detect the compatibility characteristic, an incompatible subset of the set of design constraints using a logic testing technique.

5. The method of claim 3, further comprising:
   combining, based on and in response to identifying the compatible subset of the set of design constraints, the compatible subset in the constraint model into a single new design constraint by establishing a single input and a single output for the compatible subset.

6. The method of claim 3, further comprising:
   evaluating each individual design constraint of the compatible subset to a Boolean true value.

7. The method of claim 3, further comprising:
   generating, for each individual design constraint of the compatible subset, a new modeled design constraint; and
   building, based on generating the new modeled design constraint for each individual design constraint of the compatible subset, a set of modeled compatible design constraints.

8. The method of claim 7, further comprising:
   removing, in response to building the set of modeled compatible design constraints, the set of design constraints.

9. The method of claim 4, further comprising:
   masking, based on and in response to identifying the incompatible subset of the set of design constraints, the incompatible subset in the constraint model.

10. The method of claim 4, further comprising:
    evaluating at least one design constraint of the incompatible subset to a Boolean false value.

11. The method of claim 9, wherein masking the incompatible subset in the constraint model occurs in a dynamic fashion.

12. The method of claim 1, further comprising:
   extracting, by filtering the set of design constraints, a compatible subset.
13. The method of claim 12, further comprising:
   extracting, by filtering the set of design constraints, an incompatible subset.
14. The method of claim 12, further comprising:
   resolving the new global constraint based on the compatible subset.
15. The method of claim 1, further comprising:
   embedding the constraint model with the verification process for the integrated circuit design.
16. The method of claim 1, wherein the receiving, the constructing, the determining, and the processing each occur in an automated fashion without user intervention.
17. A system for verifying an integrated circuit design, the system comprising:
   a memory having a set of computer readable computer instructions, and
   a processor for executing the set of computer readable instructions, the set of computer readable instructions including:
   receiving, with respect to a verification process for the integrated circuit design, a set of design constraints;
   constructing, based on the set of design constraints, a constraint model by assembling a physical circuit, the constraint model representing one or more aspects of the integrated circuit design in the physical circuit, the set of design constraints applied as inputs to logic gates in the physical circuit;
   determining, using the constraint model, a new global constraint; and
   processing, using the new global constraint, the verification process for the integrated circuit design, wherein the constraint model uses a set of chicken switches to sort, in a selective fashion, the set of design constraints into a plurality of subsets of the set of design constraints, the chicken switches including a latch having a special configuration bit held permanently to a randomized value.

18. A computer program product for verifying an integrated circuit design, the computer program product comprising a computer readable storage medium having program instructions embodied therewith, wherein the computer readable storage medium is not a transitory signal per se, the program instructions executable by a processor to cause the processor to perform a method comprising:
   receiving, with respect to a verification process for the integrated circuit design, a set of design constraints;
   constructing, based on the set of design constraints, a constraint model by assembling a physical circuit, the constraint model representing one or more aspects of the integrated circuit design in the physical circuit, the set of design constraints applied as inputs to logic gates in the physical circuit;
   determining, using the constraint model, a new global constraint; and
   processing, using the new global constraint, the verification process for the integrated circuit design, wherein the constraint model uses a set of chicken switches to sort, in a selective fashion, the set of design constraints into a plurality of subsets of the set of design constraints, the chicken switches including a latch having a special configuration bit held permanently to a randomized value.
19. The computer program product of claim 18, wherein at least one of:
   the program instructions are stored in the computer readable storage medium in a data processing system, and wherein the program instructions were downloaded over a network from a remote data processing system; or
   the program instructions are stored in the computer readable storage medium in a server data processing system, and wherein the program instructions are downloaded over a network to a remote data processing system for use in a second computer readable storage medium with the remote data processing system.

* * * * *